US009819902B2

(12) United States Patent
Rintel et al.

(10) Patent No.: US 9,819,902 B2
(45) Date of Patent: Nov. 14, 2017

(54) PROXIMATE RESOURCE POOLING IN VIDEO/AUDIO TELECOMMUNICATIONS

(71) Applicant: Microsoft Technology Licensing, LLC, Redmond, WA (US)

(72) Inventors: Edward Sean Lloyd Rintel, Cambridge (GB); Richard Harry Robert Harper, Cambridge (GB); Kenton Paul Anthony O'Hara, Bristol (GB); Philip Charles Gosset, Stroud (GB); Daniel Wilkinson Gratiot, London (GB); Ian James Ray, Espoo (FI)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/663,367

(22) Filed: Mar. 19, 2015

(65) Prior Publication Data

US 2016/0277708 A1    Sep. 22, 2016

(51) Int. Cl.
*H04W 76/02* (2009.01)
*H04L 12/18* (2006.01)
(Continued)

(52) U.S. Cl.
CPC ......... *H04N 7/142* (2013.01); *H04L 12/1827* (2013.01); *H04N 7/147* (2013.01);
(Continued)

(58) Field of Classification Search
None
See application file for complete search history.

(56) References Cited

U.S. PATENT DOCUMENTS

| 4,438,527 A | 3/1984 | Hammond |
| 5,712,911 A | 1/1998 | Her |

(Continued)

FOREIGN PATENT DOCUMENTS

| WO | 2014027190 A1 | 2/2014 |
| WO | WO2014/070106 A1 | 5/2014 |

OTHER PUBLICATIONS

Ostlund, Clay, "Collaboration Update", Published on: Aug. 2014, Available at: http://www.marconet.com/files/7014/0862/7187/Cisco_Video.pdf.

(Continued)

*Primary Examiner* — Fan Tsang
*Assistant Examiner* — Jeffrey Lytle

(57) ABSTRACT

A telecommunications device sends and receives messages comprising data about telecommunications resources and resource state of proximate devices. The telecommunications device has a processor configured to determine a proximate resource pool using at least the telecommunication resources of the other devices, and the state of the telecommunications resources of the other devices, the proximate resource pool comprising a list of content streams being generated by, or potentially being generated by, specified ones of the other devices. The processor is configured to receive instructions from one of the other devices, the instructions being to add, divert or stop a specified content stream of the proximate resource pool within a telecommunications activity ongoing at the device. In various examples, the processor is configured to execute the instructions responsive to the instructions being from a trusted device, or responsive to user authorization.

19 Claims, 9 Drawing Sheets

(51) Int. Cl.
*H04W 84/12* (2009.01)
*H04N 7/14* (2006.01)
(52) U.S. Cl.
CPC ............ *H04N 7/148* (2013.01); *H04W 76/02* (2013.01); *H04L 12/1822* (2013.01); *H04W 84/12* (2013.01)

(56) References Cited

U.S. PATENT DOCUMENTS

| | | | |
|---|---|---|---|
| 5,987,106 | A | 11/1999 | Kitamura |
| 6,577,333 | B2 | 6/2003 | Tai et al. |
| 7,590,941 | B2 | 9/2009 | Wee et al. |
| 7,978,838 | B2 | 7/2011 | Rodman et al. |
| 8,644,481 | B2 | 2/2014 | Bear et al. |
| 8,681,203 | B1 | 3/2014 | Yin et al. |
| 2006/0132595 | A1 | 6/2006 | Kenoyer et al. |
| 2007/0217436 | A1 | 9/2007 | Markley et al. |
| 2008/0181132 | A1* | 7/2008 | Underhill ............ H04L 12/1818 370/254 |
| 2008/0299951 | A1* | 12/2008 | Karkanias ............ H04L 67/303 455/414.1 |
| 2009/0319613 | A1* | 12/2009 | Hjelm ................ H04L 67/16 709/204 |
| 2010/0082784 | A1* | 4/2010 | Rosenblatt ......... H04L 12/2812 709/222 |
| 2011/0093273 | A1 | 4/2011 | Lee et al. |
| 2011/0246552 | A1* | 10/2011 | Nicholson .............. H04L 67/14 709/202 |
| 2011/0319128 | A1 | 12/2011 | Miwa |
| 2013/0106976 | A1* | 5/2013 | Chu .................... H04L 65/1069 348/14.02 |
| 2013/0111039 | A1* | 5/2013 | Gomes ................ H04W 4/023 709/227 |
| 2014/0095601 | A1* | 4/2014 | Abuelsaad ........... G06F 9/5072 709/204 |
| 2014/0139426 | A1 | 5/2014 | Kryze et al. |
| 2014/0222941 | A1* | 8/2014 | Tabone ................ H04W 4/023 709/208 |
| 2015/0020151 | A1 | 1/2015 | Ramanathan |

OTHER PUBLICATIONS

Davis, Jeff, "Highfive Success Center", Published on: Nov. 13, 2014, Available at: https://success.highfive.com/hc/en-us/articles/201469725-Mic-and-speakers-muted-when-entering-call.

"International Search Report & Written Opinion Received for PCT Application PCT/US2016/022519", dated Jun. 29, 2016, 11 Pages.

The PCT International Preliminary Report on Patentability for PCT Application No. PCT/US2016/022519, 6 pages. dated Jun. 1, 2017.

* cited by examiner

PROXIMATE RESOURCE POOLING IN VIDEO/AUDIO TELECOMMUNICATIONS

BACKGROUND

There is an ongoing need to facilitate easy dynamic ad-hoc and flexible video and/or audio telecommunications using multiple input/output resources on different types of computing device, such as laptop computers, smartphones, personal computers, wearable computing devices, tablet computers and others. Often a party to a video and/or audio call may wish to use more than one computing device during a call, may wish to switch between different computing devices during a call, or want to easily connect several local devices to one call. Existing approaches for enabling these scenarios involve manually adding different telecommunication devices to a call. This is time consuming and cumbersome for the end user, who is trying to concentrate on the call itself, rather than the technology.

Proximate communications devices are able to communicate using Bluetooth (trade mark) technology, for example, to enable a Bluetooth headset to act as the audio input/output for a video call on a proximate smartphone. However, many end users do not make use of this type of Bluetooth and similar connection methods because of security risks and/or because of complexity or not knowing how to use the functionality. Besides, manual configuration is typically required on both devices, with an initial pairing operation and then a connection each time, as well as constant re-pairing if devices are shared by multiple users. However, even if this is accomplished, such a connection only allows for the reasonable simple relay of an audio connection. Switching devices dynamically during a video/audio call is generally not possible, so users typically use the workaround of hanging up a call on one device and calling again from a different device, breaking the flow of the call. Adding a second local video window to one side of a dyadic video call in progress is also difficult. A workaround would be for the local user to create and use a second service username on a second device and then dial into the call with that device's audio muted, effectively creating a multi-party call with two video captures on one end. Such workarounds are clearly onerous and limited in their utility.

The embodiments described below are not limited to implementations which solve any or all of the disadvantages of known video/audio telecommunications systems.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

A telecommunications device has an output configured to send messages comprising data about telecommunications resources of the device. It also has an input configured to receive messages about telecommunications resources and current state of telecommunications resources only of physically proximate telecommunications devices. The telecommunications device has a processor configured to determine a proximate resource pool using at least the telecommunication resources of the other devices, and the state of the telecommunications resources of the other devices, the proximate resource pool comprising a list of content streams being generated by, or potentially being generated by, specified ones of the other devices. The processor is configured to receive instructions from one of the other devices, the instructions being to add, divert or stop a specified content stream of the proximate resource pool within a telecommunications activity ongoing at the device. In various examples, the processor is configured to execute the instructions responsive to the instructions being from a trusted device, or responsive to user authorization.

In an example, a telecommunications device has an output configured to send messages comprising data about telecommunications resources of the device and current state of the telecommunications resources of the device. The telecommunications device has an input configured to receive messages which are known to be from one or more other telecommunications devices physically proximate to the telecommunications device, about telecommunications resources and current state of telecommunications resources of the physically proximate telecommunications devices. A processor at the telecommunications device is configured to determine a proximate resource pool using at least the telecommunication resources of the other devices and the state of the telecommunication resources of the other devices, the proximate resource pool comprising a list of content streams being generated by, or potentially being generated by, specified ones of the other devices. The processor may be configured to send to a display, data about the proximate resource pool and to receive user input selecting at least one of the content streams and at least one of the other devices. In various examples the processor is the processor configured, in response to the received user input, to send instructions to the selected one of the other devices, the instructions being to add, divert or stop the selected content stream within a telecommunications activity ongoing at the selected one of the other devices.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

Figure 1:
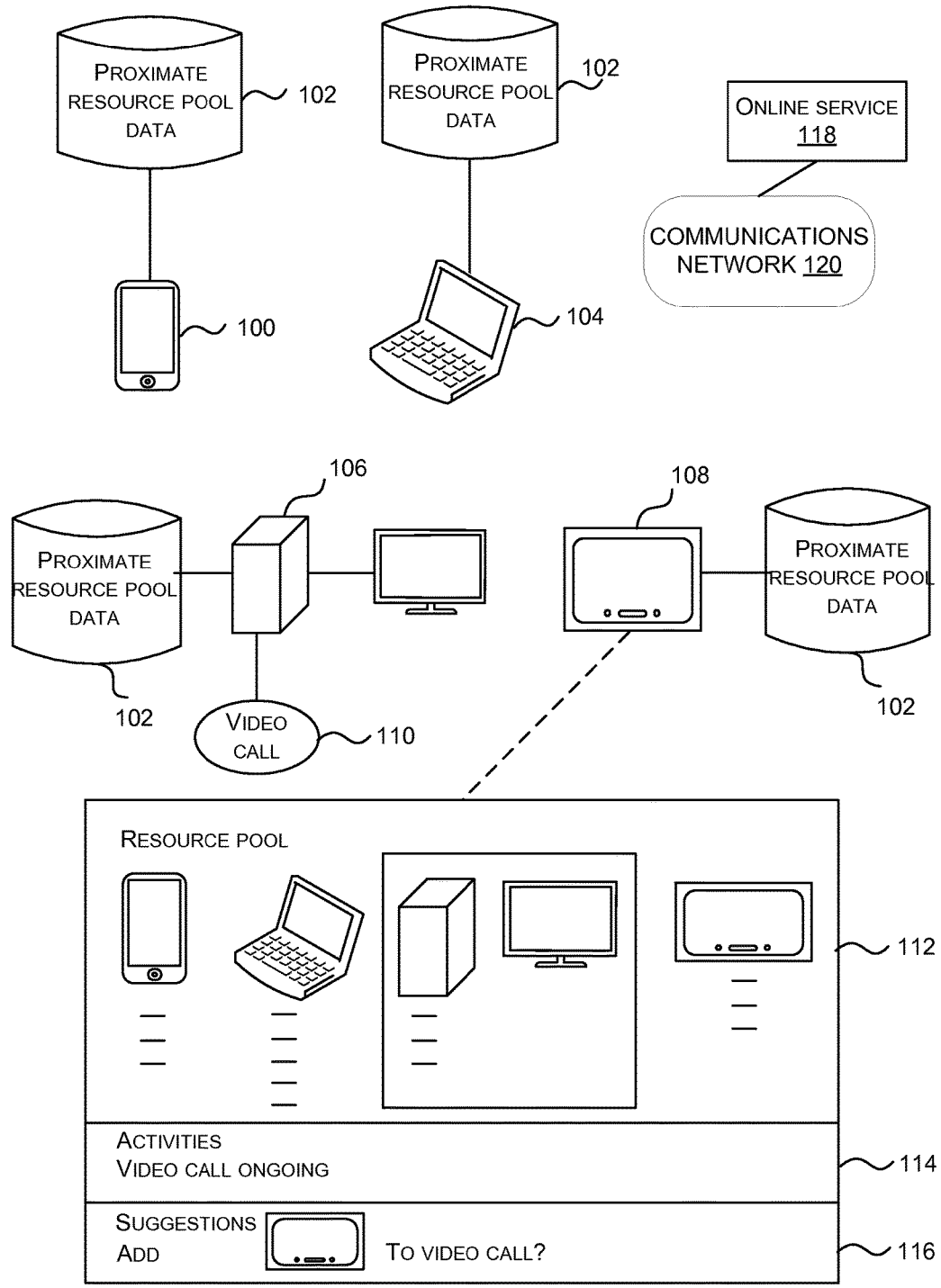
FIG. 1 is a schematic diagram of a smartphone, a laptop computer, a personal (desktop) computer, and a tablet computer, and of a graphical user interface display at the tablet computer showing telecommunications applications, resources in the proximate resource pool, and suggestions for editing the combination of content streams.

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

The inventors have devised technology to enable content streams generated or replayed by input/output resources of end user telecommunications devices, at least some of which devices are physically proximate to one another (such as being in the same room or otherwise definable geographical vicinity), to be flexibly directed across devices and applications effectively and easily without expert knowledge on behalf of the end user. This enables content streams to be added, diverted or stopped within telecommunications calls or other telecommunications activities of which an end user telecommunication device is a party. The content streams generated from proximate device resources may be added, diverted, or stopped across devices and applications on-the-fly in an ad hoc manner and in real time. Security risks are minimized by careful design of the processes, for example, by implementing checks behind the scenes and/or requesting user authorization.

For example, at the local end of a video call, two local telecommunications devices, such as smartphones or other end user telecommunications devices, generate a shared list of their telecommunications input/output resources for the purpose of users dynamically editing the combination of content streams from both devices to be sent to the remote endpoint of the video call.

Physically proximate devices generate and share a proximate resource pool which is used to flexibly direct the content streams. A proximate resource pool consists of a shared list of the telecommunications input/output resources (e.g. cameras, displays, microphone, speakers etc.), the current state of the resources (active, background, inactive), and optionally their availability (the amount of a resource which is currently available, if relevant), of a set of connected proximate devices. Input/output resources generate content streams by capturing live content or playing back recorded content. A content stream consists of a monodirectional transmission of media content and/or sensor data from an input/output resource of a device. The proximate resource pool allows users to treat content streams as flexibly directable across devices and applications.

Resource functionality of the proximate devices creates a tacit definition of the features of a telecommunications act. For example, if a device has a speaker, then sound is a property of a telecommunications act that might come into play. If the device has a keyboard then it might be the exchange of written (typed) content that comes into play. The arrangement of the technology resources defines the properties of the communications act that can be disassembled and allocated across different devices. The proximate resource pool maps the resources as a way of defining relevant property elements of the telecommunications act at the same time as it creates its resource register (proximate resource pool).

End user telecommunications devices are those able to act as endpoints of an audio and/or video telecommunications call over any suitable type of telecommunications network. Examples include but are not limited to smartphones, tablet computers, laptop computers, personal computers, wearable computers, video conferencing equipment such as used in meeting rooms, and others.

Telecommunications activities comprise calls such as calls made and received via telecommunications applications typically consist of synchronized full-duplex video and/or audio, with variously constituted audio and video compression and decompression streams but may include associated activities within the same application, such as text and emoticon messaging, file sharing, collaborative workspaces, screen sharing, application sharing, and/or remote desktop control, each with their own discrete protocols. Telecommunications activities include actions carried out in order to establish or end a telecommunications call, such as establishing a conference bridge, joining two existing calls, or other actions. Telecommunications activities also include internet protocol broadcasting of video and/or audio streams.

Telecommunications resources, of a telecommunications endpoint, comprise any software or hardware used as part of a telecommunications call or video/audio internet protocol broadcast. A non-exhaustive list of examples of input resources includes cameras, microphones, speakers, keyboards, mice, styluses, tactile and haptic input systems, gestural input systems, eye-tracking systems, location systems etc. A non-exhaustive list of output resources include displays, speakers, visual indicators (e.g. lights), audio indicators (e.g. buzzers), tactile and haptic output systems, location systems etc. Both input and output features may generate content streams by capturing live content or playing back recorded content. A non-exhaustive list of other associated parts includes multiplexers, modems, video codecs, audio codecs, and protocols for associated collaboration activities such as a text-over-picture protocol (i.e. subtitling), a speech-to-text (and vice versa) protocol, a language translation protocol, desktop sharing protocol, screen sharing protocol, a text and emoticon messaging protocol, a file sharing protocol.

Telecommunications devices may use local or remote methods (or a hybrid) to discover proximate devices and to establish one or more persistent communications channels for communicating a proximate resource pool.

Local methods for discovering proximate telecommunications devices include any one or more of the following:

local wireless communications, shared-space sensing (for example using optical methods such as optical room mapping, light sensing, bar-codes, QR codes, or audio channels such as ambient sonic matching or broadcast sonic recognition), device and human proximity sensing (for example using electrical field sensing, optical depth sensing, haptic sensing), and other methods.

Remote methods to discover proximate devices may include use of an online service. Users may be aware of physically proximate devices and may inform an online service about this. In this case a user of a telecommunications device is able to send an online service details of physically proximate telecommunications devices he or she has noticed. For example, the devices may be pre-registered with the same online service and a user may be able to manually select, at the online service, devices which are physically proximate to his or her telecommunications device.

The process of discovering physically proximate devices may involve the use of contextual data such as any one or more of: shared calendar entries, contact list entries, project management task entries, reminder entries, to-do list entries, and others. Contextual data may be used in combination with discovery using an online service. In this case, the online service may have access to calendar entries and other context data associated with telecommunications devices registered with the online service. In some examples contextual data is used in combination with discovery using local methods. In this case contextual data is sent between local devices as part of the discovery process.

Once proximate devices are discovered, communications channels are established between the proximate devices. The communications channels may be direct between the proximate devices or may be remote, such as via an online service or other entity. Any suitable type of communications channels may be used including wired or wireless communications.

Local wireless communications may include protocols such as Wi-Fi (trade mark), Wi-Fi Direct (trade mark), Wi-Fi Aware (trade mark), BT (trade mark), BTLE (trade mark), ultra-wideband, and other methods. Local wireless communications used for discovering connections may use a broadcast method whereby output messages are repeated substantially continuously.

Remote methods for discovery and establishing channels may be used where no direct local connection exists for all or part of the process. Remote communications channels may include Wi-Fi (trade mark), mobile data (3G, 4G, 5G, etc.), wired connections (e.g. Ethernet etc.), and other methods. An online service may act to relay messages between devices where no direct local connection exists. The online directory service may be foregrounded or backgrounded at the end user telecommunications device. The online service may be a stand-alone service used exclusively for enabling proximate resource pooling or it may be part of an online service used by an existing telecommunications application.

Connections between the physically proximate telecommunications devices may be semi-autonomously established by devices and/or online services using contextual data, which may include shared calendar entries, contact list entries, project management task entries, reminder entries, to-do list entries, and others. Connection may be manually established by users, or a hybrid of both semi-autonomous and manual methods.

A persistent communications channel session may be established between the physically proximate devices for the purpose of generating a proximate resource pool, updating the proximate resource pool, and exchanging instructions about the proximate resource pool. A persistent communications channel configuration may also be saved on devices and/or online services for future sessions between the same devices.

In some examples, where an online service is used, the proximate resource pool is maintained by the online service and communicated to the individual proximate devices. In some examples, where there is no online service, the proximate resource pool is calculated separately by individual ones of the proximate devices.

As mentioned above, a proximate resource pool is computed using data about input/output resources of the physically proximate devices, and about state of the input/output resources. The proximate resource pool may comprise a list of content streams being generated by, or potentially being generated by, specified ones of the proximate devices.

End user input using the proximate resource pool may comprise choosing a telecommunications input/output resource content stream on any specific pooled device, and directions to add, divert, or stop the relevant content stream to/on a specific telecommunication application on any specific pooled device. A telecommunications device may act as both a sender and a receiver of the instructions required to carry out end user content stream choices.

A proximate resource pool may be available in just one particular telecommunication application such that all proximate instances of that application can access the pool, but not other applications. More broadly, it might be available to a family of related telecommunications applications. At the broadest level it might be available to all telecommunications applications that are installed on devices able to act on proximate resource pooling.

FIG. 1 is a schematic diagram of four telecommunications endpoint devices which in this example include a smartphone 100, a laptop computer 104, a desktop, personal computer 106 and a tablet computer 108. Each telecommunications endpoint device generates and maintains proximate resource pool data (102) known to that device. Proximate resource pool data is described above. It is computed from data about telecommunications resources and data about state of telecommunications resources. Proximate resource pool data comprises a list of content streams being generated by, or potentially being generated by, specified ones of the telecommunications endpoint devices. Optionally, an online service 118 is accessible by the telecommunications endpoint devices via a communications network 120 such as the internet or any other communications network. The online service 118 may also generate and maintain the proximate resource pool although this is not essential.

In the example of FIG. 1 the telecommunications endpoints are physically proximate to one another, for example, because they are in the same room. The personal computer 106 is a telecommunications endpoint of a video call 110 which is ongoing with another entity, remote of the room, and which is not shown in FIG. 1 for clarity.

Each telecommunications endpoint comprises a display or has means for displaying information about the proximate resource pool. FIG. 1 shows an example of a graphical user interface at tablet computer 108 which comprises information about the proximate resource pool 112 known to the tablet computer 108, information about the application list of the proximate resource pool 114 known to the tablet computer 108 and suggestions of changes to configurations in the proximate resource pool 116. In this example, the information about the proximate resource pool 112 comprises an icon representing each of the smartphone 100, laptop computer 104, personal computer 106 and tablet computer 108 and a list of telecommunications resources of each telecommunications endpoint that the tablet computer 108 knows about. The suggestions 116 may comprise suggestions to add, divert or stop a content stream within a telecommunications call ongoing at one of the pooled devices. The content stream may be an actual or potential content stream of any of the pooled devices.

A user is able to accept or reject the suggestions 116 by making user input of any suitable type. A user is also able to edit the combination of content streams 114 using the resources identified in the proximate resource pool 112 section of the graphical user interface. For example, by touching the resources to select them or in other ways.

The tablet computer 108 receives the user input and puts a command to add, divert or stop a content stream into effect. This is achieved in a simple and secure manner which reduces the risk of malicious devices taking over resources of other devices in an unauthorized manner. More detail is given with respect to FIGS. 2 and 3 below.

In this way an end user of a telecommunications endpoint is able to simply and easily make use of telecommunications resources of other telecommunications devices which are physically proximate. Users may choose to set up ongoing trust between devices (saved directly on the device or on an online directory service), but the actual sets and combinations of resources do not need to be pre-defined. The sharing of telecommunications resources is thus achieved in a flexible and ad hoc manner as suits user needs for particular telecommunication tasks. The end user does not need to have expert knowledge or to go through an onerous setup process.

Figure 2:
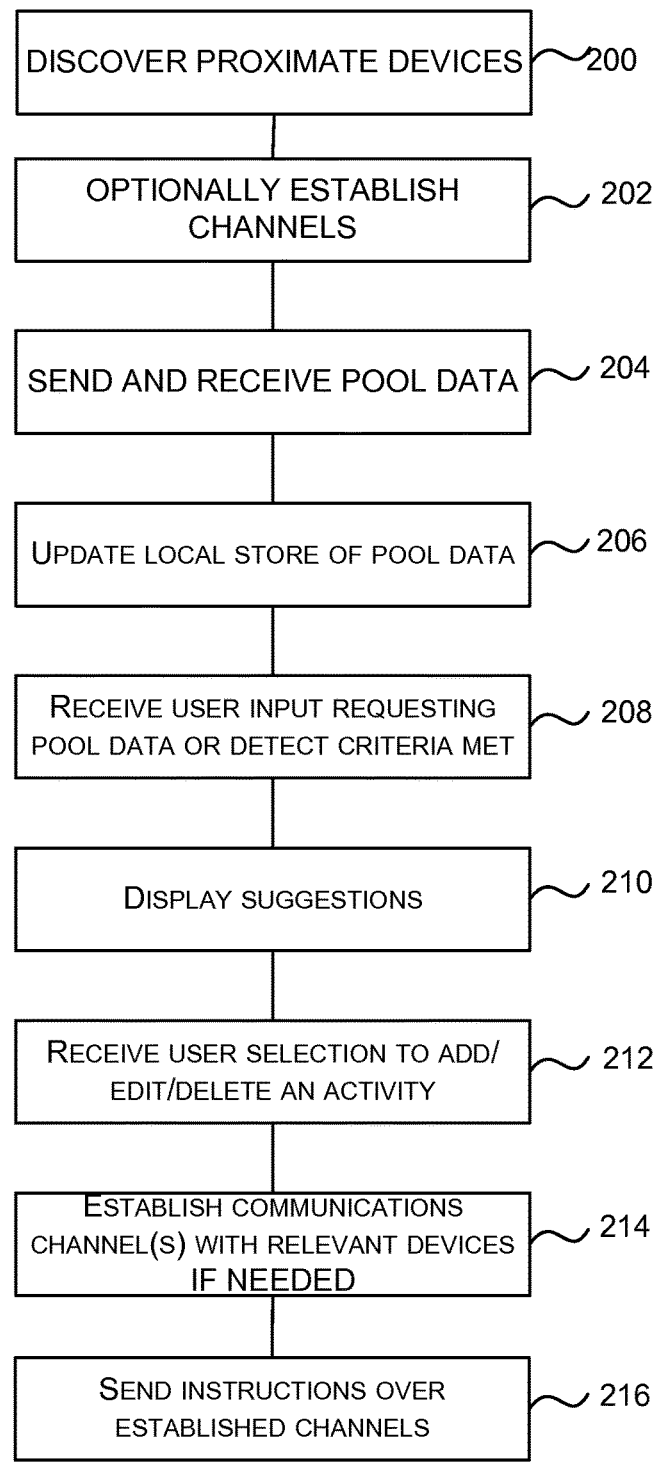
FIG. 2 is a flow diagram of a method at a computing device for discovering a proximate resource pool and instructing editing of the content streams by addition of a content stream, diversion of a content stream, muting of a content stream, or stopping a content stream.
Figure 3:
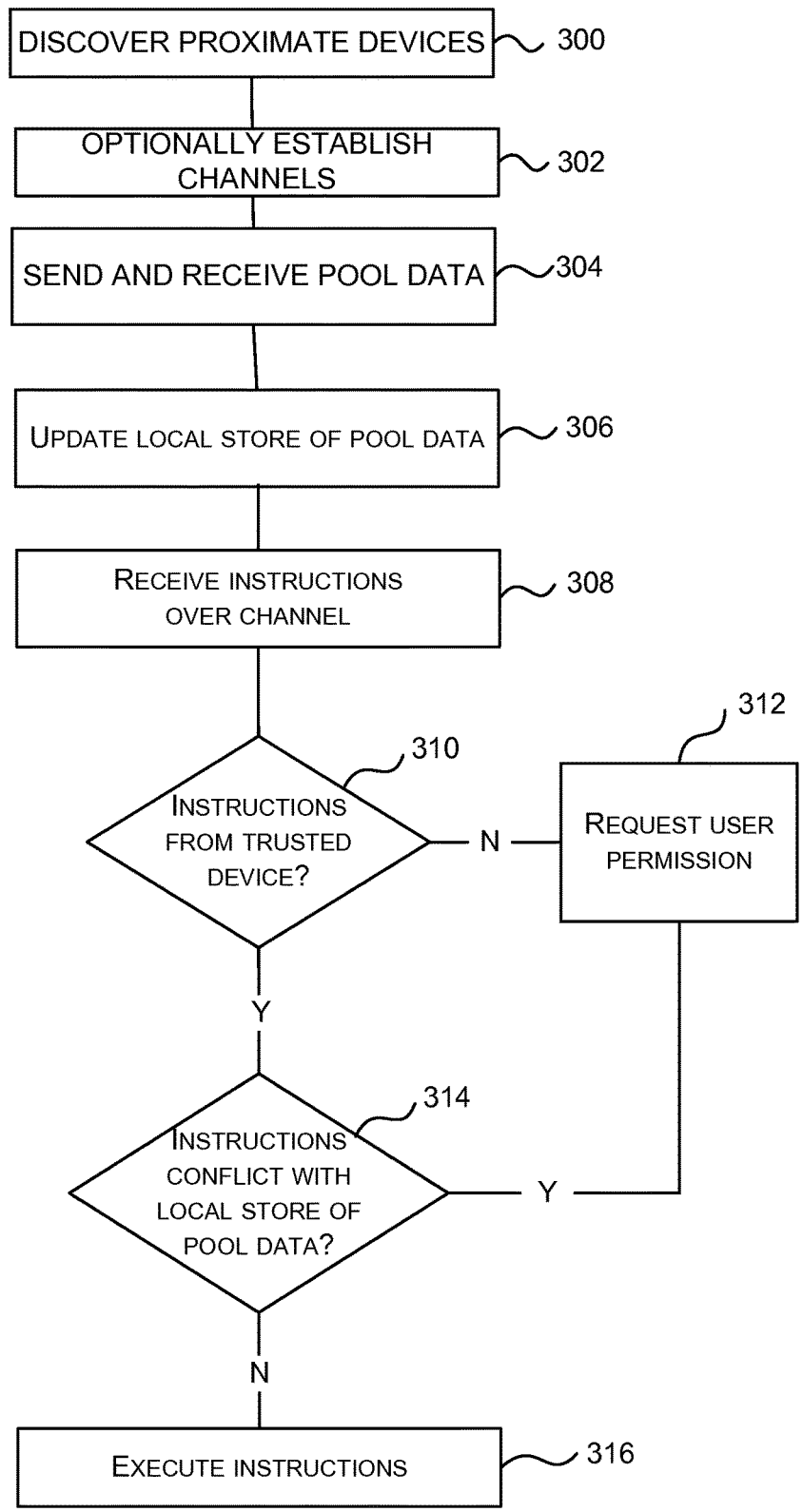
FIG. 3 is a flow diagram of a method at a computing device for receiving, checking, and executing instructions to edit the combination of content streams.

More detail about how the resource pool data is shared, and about how the resources are used is now given with respect to FIGS. 2 and 3. FIG. 2 is a flow diagram of a method at a telecommunications endpoint device from the point of view of sending instructions to another telecommunications endpoint device. FIG. 3 is a flow diagram of a method at a telecommunications endpoint device from the point of view of receiving and executing instructions. The methods of FIGS. 2 and 3 may be carried out by the same telecommunications endpoint device concurrently or asynchronously.

The telecommunications endpoint device discovers 200 one or more other physically proximate telecommunications endpoint devices. This is done using any of the local and remote methods described above.

The telecommunications endpoint device optionally establishes 202 communications channels with the physically proximate telecommunications endpoint devices. These channels may be direct local channels or may be via an online service or other remote entity.

The telecommunications endpoint device sends and receives 204 data to enable it to compute the proximate resource pool. For example, where local wi-fi aware (trade mark) technology is used, the data is broadcast without the need for local wi-fi (trade mark) communications channels to be set up between the proximate devices. In examples where communications channels are established between the devices these use any suitable type of communications channel as described above. For example, channels via an online service and/or local wi-fi (trade mark) communications channels.

The data which is sent and received is proximate resource pool data. It may comprise data about telecommunications resources and current state of telecommunications resources. The proximate resource pool data which is sent and received may comprise data about actual or potential content streams. Data about resources which are marked as private is not sent.

In some examples, the telecommunications endpoint device is a peer node of a peer to peer network. The peer to peer network comprises other telecommunications endpoint devices which may be physically local or physically remote from one another. For example, in FIG. 1 the peer to peer network may comprise the smartphone 100, the laptop computer 104, the personal computer 110, the tablet computer 108 and a remote telecommunications endpoint which is a party to the video call 110. The peer nodes distribute amongst themselves the proximate resource pool data using communications channels set up between the telecommunications endpoint devices.

The telecommunications endpoint device updates 206 its local store of proximate resource pool data using the data it receives. Thus the local stores of proximate resource pool data may not be exactly the same between endpoint devices, and will change over time. Entries in the local stores of proximate resource pool data may be time stamped and/or may expire.

Proximate resource pool data may include the state of each resource (active, background, inactive). In some examples, the proximate resource pool data may also include resource availability data, that is, data specifying the amount of a resource which is currently available.

In some examples, the telecommunications endpoint device receives 208 user input requesting the proximate resource pool data. For example, an end user may bring up a graphical user interface, such as the graphical user interface shown in FIG. 1. In other examples, the telecommunications endpoint device brings up the graphical user interface autonomously when it detects certain criteria are met.

The telecommunications endpoint device computes one or more suggestions using the current proximate resource pool data, and rules and historical information about the use of resources in applications. The suggestions are to edit actual or potential content streams (by adding, diverting, or stopping) available to a current telecommunications application. In some examples the telecommunications endpoint device displays the suggestions 210 at the graphical user interface or using a pop up display similar to a notification message.

User input is received 212 to edit the combination of content streams available to the current telecommunications application. The user input may be the result of accepting a suggestion, or making other user input at the graphical user interface (or other type of user interface).

The telecommunications endpoint device sends 216 instructions to put the edited combination of content streams into effect. The instructions may be encrypted in some examples. In examples where communications channels have already been set up between the proximate devices, the instructions are sent over one or more of these channels. If no communications channel yet exists to enable the instructions to be sent, a suitable communications channel is set up 214.

With reference to FIG. 3 a telecommunications endpoint receives 308 instructions over a communications channel which has been established 302 between it and a sender of the instructions. The telecommunications endpoint discovers 300 proximate devices, optionally establishes 302 channels with the proximate devices, and sends and receives 304 proximate resource pool data as described above with reference to FIG. 2. It updates 306 its local store of proximate resource pool data.

The telecommunications endpoint which has received the instructions, checks 310 whether the instructions are from a trusted device. A device is trusted if it has been authorized for ongoing proximate resource pooling access. For example, the smartphone 100, laptop computer 104, personal computer 106 and tablet computer 108 of FIG. 1 may have credentials that indicate that they belong to the same family and each device may be aware of the identity of each other device as a result of being on the same Wi-Fi (trade mark) network for example.

If the instructions are not from a trusted device, the telecommunications endpoint requests user permission 312 to proceed with the instructions. For example, by displaying a notification type pop up window or in other ways. This may allow trust for one session or indefinite sessions.

If the instructions are from a trusted device, a check 314 is made against the local store of proximate resource pool data to see whether the instructions conflict with that local store. For example, the local store of proximate resource pool data may indicate that a resource needed by the instructions is already fully utilized. Where a conflict is found, user permission may be requested 312, with an indication of the detected conflict, so that the user is able to terminate the instructions or to trigger the instructions anyway, for example, where the user knows the conflict will not in fact occur.

If no conflict is found the telecommunications endpoint device executes 316 the instructions. For example, by adding, diverting or stopping a content stream from reaching a telecommunications application at the device. In another example, the instructions are executed by adding a party to an ongoing call, by diverting an audio stream of a video call to another entity, by removing a party from an ongoing call, by establishing a new call, by joining two or more calls, or in other ways.

Five examples of the methods of FIGS. 2 and 3 are now given with reference to the message sequence charts of FIGS. 4 to 8. A message sequence chart comprises a plurality of vertical lines, each representing an entity such as a telecommunications endpoint device. Horizontal arrows between the lines represent messages, or calls between the entities. The relative vertical position of the horizontal lines represents chronological order. These examples represent scenarios of use and the technical method for achieving it but do not represent the limit of possible ways of using the resource list. The five example are: single audio stream relay FIG. 4; single video stream addition and subtraction FIG. 5; dual video and audio stream addition and subtraction FIG. 6; multiple private and public video and audio stream addition and subtraction FIG. 7; multiple public video and audio stream addition and subtraction FIG. 8.

Figure 4:
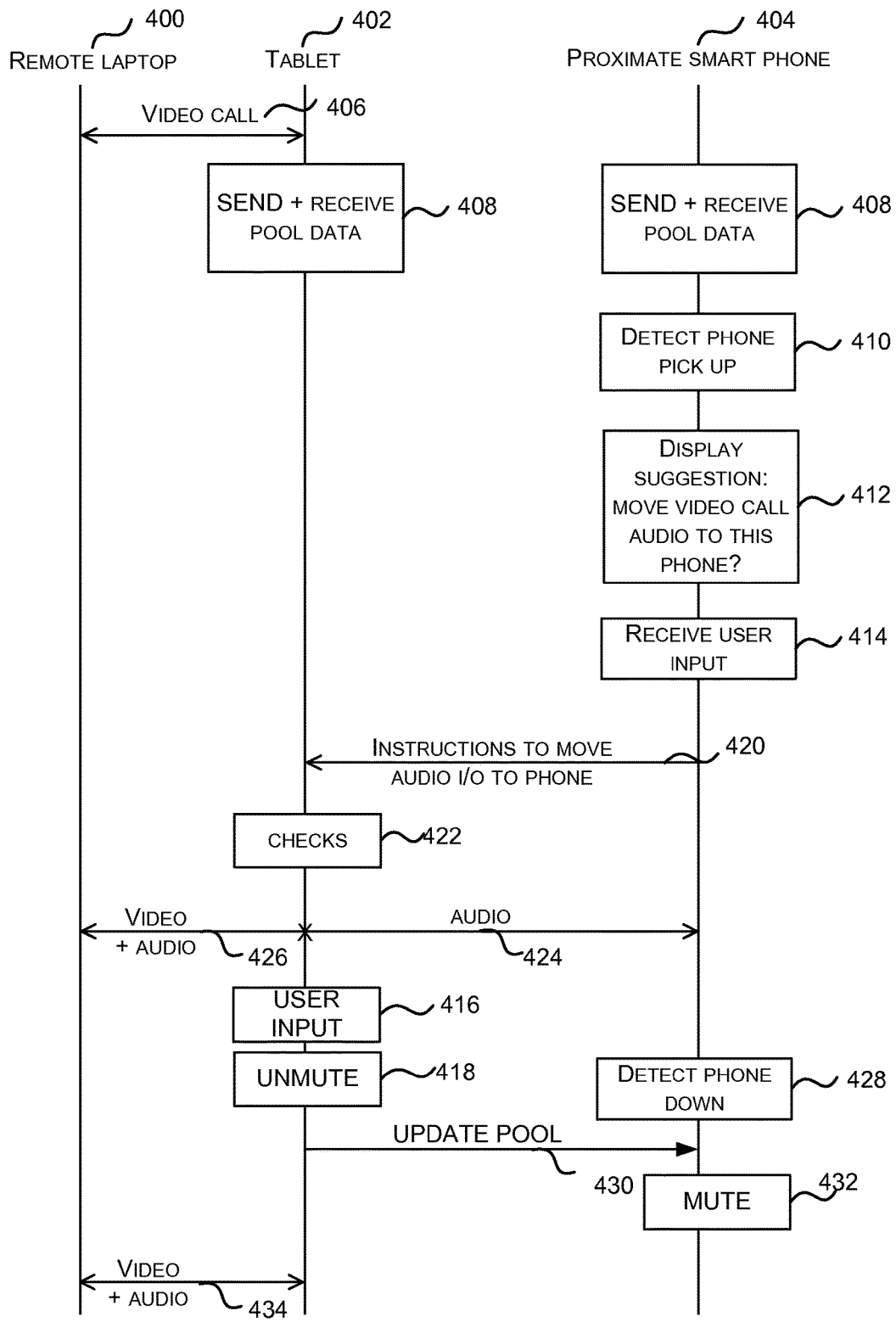
FIG. 4 is a message sequence chart of an example in which a smartphone which is proximate to a tablet computer takes the audio part of a video call which is ongoing at the tablet computer.

In the example of FIG. 4 a remote laptop 400 is an endpoint of a video call with a tablet computer 402. In close physical proximity to the tablet computer 402 is a smartphone 404. The smartphone 404 and the tablet computer 402 may have the credentials of the same person and may have been set to trust one another, that is, the tablet knows the credentials of the smartphone 404 and the smartphone knows the credentials of the tablet 402.

The tablet computer 402 and the smart phone 404 have discovered one another as proximate devices using any of the methods described above.

The tablet computer 402 and the smartphone 404 both send and receive proximate resource pool data using any of the local and remote methods described above. An online service may be used for the discovery and/or sending and receiving the proximate resource pool data even though no online service is shown in FIG. 4 for clarity.

A user picks up the smartphone and the smartphone detects activation 410, for example, by detecting that the phone has been unlocked, by using sensor data from the smartphone (e.g. from accelerometers, gyroscopes, light sensors etc.) smartphone, or in other ways (e.g. by user input into an interface).

The smartphone 404 requests a persistent communications channel 416 be activated with the tablet computer 402 by sending a request message to the tablet computer 402. As a result a persistent communications channel 418 is established between the tablet computer 402 and the smartphone 404.

The smartphone 404 displays 412 that the discovered tablet computer 402 is in a video call. The smartphone 404 displays 412 options for diverting the audio and/or video of the video call to the smartphone 404. The smartphone 404 receives user input 414 indicating audio.

The smartphone 404 sends 420 instructions on a local channel to the tablet computer 402. In some examples, such as where wi-fi aware (trade mark) or similar technology has been used to send and receive the pool data by broadcasting it without channels being established between the tablet 402 and the smart phone 404, the local channel is established immediately prior to sending 420 the instructions although this is not shown in FIG. 4. The instructions are to divert the audio (microphone input and speaker output) of the video call to the smartphone 404.

The tablet computer 402 receives the instructions and carries out checks 422. These are the checks described above with reference to FIG. 3 and comprise, checking that the instructions are from a trusted device, or that the instructions have been authorized by contemporaneous user input; and optionally checking that the instructions do not conflict with the proximate resource pool data local to the tablet computer.

If the checks are successfully passed, the tablet computer diverts the audio component of the video call to the smartphone 404 and mutes its own microphone. This is indicated in FIG. 4 using arrows 426 and 424.

When the tablet computer 402 receives user input 416 to unmute the tablet computer's microphone, the tablet computer's 402 audio is unmuted 418 immediately and data about the active state of the tablet computer's 402 audio is also sent to the tablet computer's 402 proximate resource pool local store. The tablet computer's 402 proximate resource pool local store sends an update 430 to the smartphone's 404 proximate resource pool local store about the active state of the tablet computer's 402 audio. On receiving the update, the smartphone 404 knows to mute 432 its audio (microphone and speaker) using one or more rules stored at the smartphone. The tablet computer returns to a state of showing both audio and video in the video call 434.

The example of FIG. 4 illustrates how the technology enables an end user to simply and easily use his smartphone to privately deal with the audio part of a video call. For example, Ann is video-calling a client on her tablet 402, talking hands-free using the tablet microphone and ambient speakers. Her tablet is connected to the café Wi Fi but she has not bothered to connect her smartphone 404—it is using her mobile data. When the talk turns to a confidential matter, Ann wants to be able to hear the client privately but still see the client on her laptop screen.

Ann picks up her smartphone. Since Ann's tablet and smartphone know that they are owned by Ann, in close proximity, and that a video call is in progress on Ann's tablet, the smartphone's interface notifies her that a call is in progress. This could be an interface on the lock screen, or, if the phone is unlocked, through a notification interface, or through Ann bringing up a specialized resource and application list interface. The interface offers Ann her choice of cameras and audio to use in the call. Ann taps on an icon to indicate smartphone microphone. Alternatively, if Ann opens the same video calling application as on the tablet, she is notified that a call is in progress on the tablet and taps on the microphone icon on the smartphone. Regardless of the method by which the smartphone microphone is activated, the audio capture and play streams of the call are diverted to the smartphone, muting on the tablet, but the video capture and display continue on the tablet. When Ann is done with the confidential portion of the call, she unmutes the tablet as the only other device still active in the call, which automatically mutes the smartphone.

Figure 5:
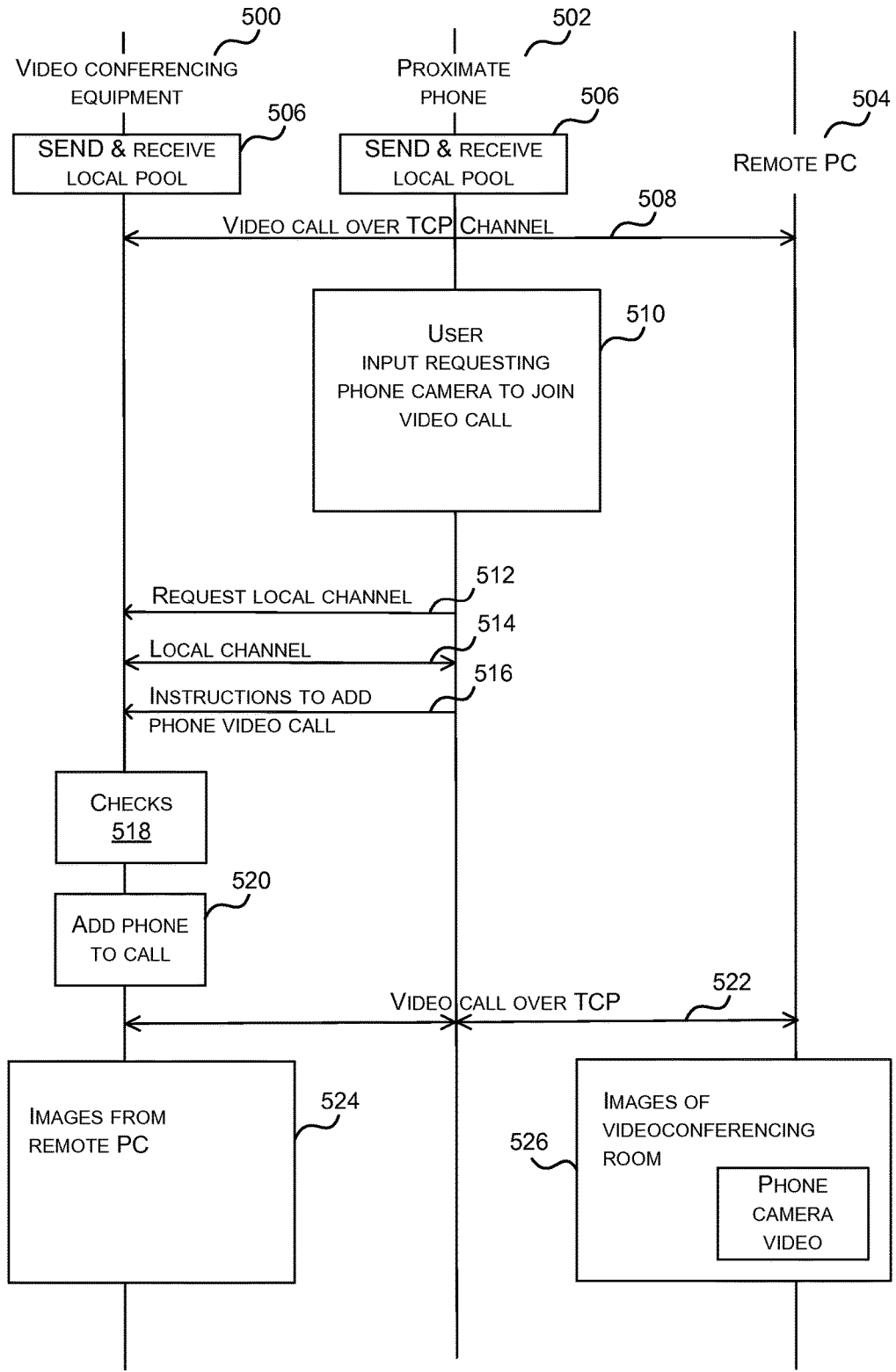
FIG. 5 is a message sequence chart of an example in which a smartphone, proximate to a video conferencing equipment, joins a video call which is ongoing at the video conferencing equipment.

In the example of FIG. 5 a public meeting room has video conferencing equipment 500 and a person in the room has a smartphone 502. The video conferencing equipment 500 is in a video call over a TCP channel 508 with a remote personal computer 504. The video conferencing equipment 500 and the proximate phone 502 discover one another as proximate devices using any of the methods described above.

The video conferencing equipment 500 and the smartphone 502 send and receive proximate resource pool data 506 as described above with reference to FIG. 2 and FIG. 3. An online service may be used for the discovery and/or for sending and receiving the proximate resource pool data even though no online service is shown in FIG. 5.

The phone 502 receives user input 510 requesting that a camera of the phone join the video call. The phone 502 requests 512 a communications channel with the video conferencing equipment 500, unless one already exists. For example, a persistent communications channel 514 is set up between the video conferencing equipment 500 and the smartphone 502. The smartphone 502 sends instructions 516 to add the phone to the video call. The instructions are sent over the persistent communications channel 514 to the video conferencing equipment 500. The videoconferencing equipment 500 carries out checks 518 such as the checks of FIG. 3 described above. If the checks are successfully passed, the video conferencing equipment adds the phone 502 to the video call 522. At the video conferencing equipment images from the remote PC are visible 524. At the remote PC, images 526 of the video conferencing room and also images of the phone camera are visible For example, the method of FIG. 5 may be used in the following scenario which illustrates the utility of the method and the ease of use from the point of view of the end users taking part in the video call.

Glen is a clothing designer hosting a local meeting with fabric seller Hank, and both are in a video call to Ian, an outsourced clothing manufacturer. Glen and Hank are calling Ian on a public meeting room desktop 500 in Glen's building, using a generic company video calling account (not Glen's personal account). Ian is on his office desktop 504. Hank, a guest who is not on Glen's local Wi-Fi network and does not use the same video calling service that Glen uses, wants to show Ian the fabric detail of a shirt on a mannequin in the room.

Hank picks up his smartphone. Hank's smartphone knows that it is close proximity to Glen and that a video call is in progress on Glen's desktop computer. The smartphone's interface notifies Hank that that a video call is in progress. This could be an interface on the lock screen, or, if the phone is unlocked, through a notification interface, or through Hank bringing up a specialized resource pool interface. The interface offers Hank his choice of cameras and audio to use in the call. Hank taps on an icon to indicate smartphone rear camera, which generates a request to add the video to Glen's desktop computer video call. Alternatively, if Hank decides to install the same video calling application as on Glen's computer, once he is running the application he is notified that a call is in progress on a nearby desktop computer and he taps on the camera icon on the smartphone, which generates a request to add the video to Glen's desktop computer video call. Regardless of the method by which Hank generates the request to add the video to Glen's desktop computer video call, Glen's desktop computer notifies Glen with an interface of the request. Glen clicks Yes and Hank's smartphone rear camera video now appears in an additional window on both Glen's local desktop and Ian's remote desktop. Hank walks over to the mannequin, moves the smartphone around the mannequin to show the fabric. When he is done, he turns his smartphone off and Hank's smartphone video disappears from Glen and Ian's displays.

Figure 6:
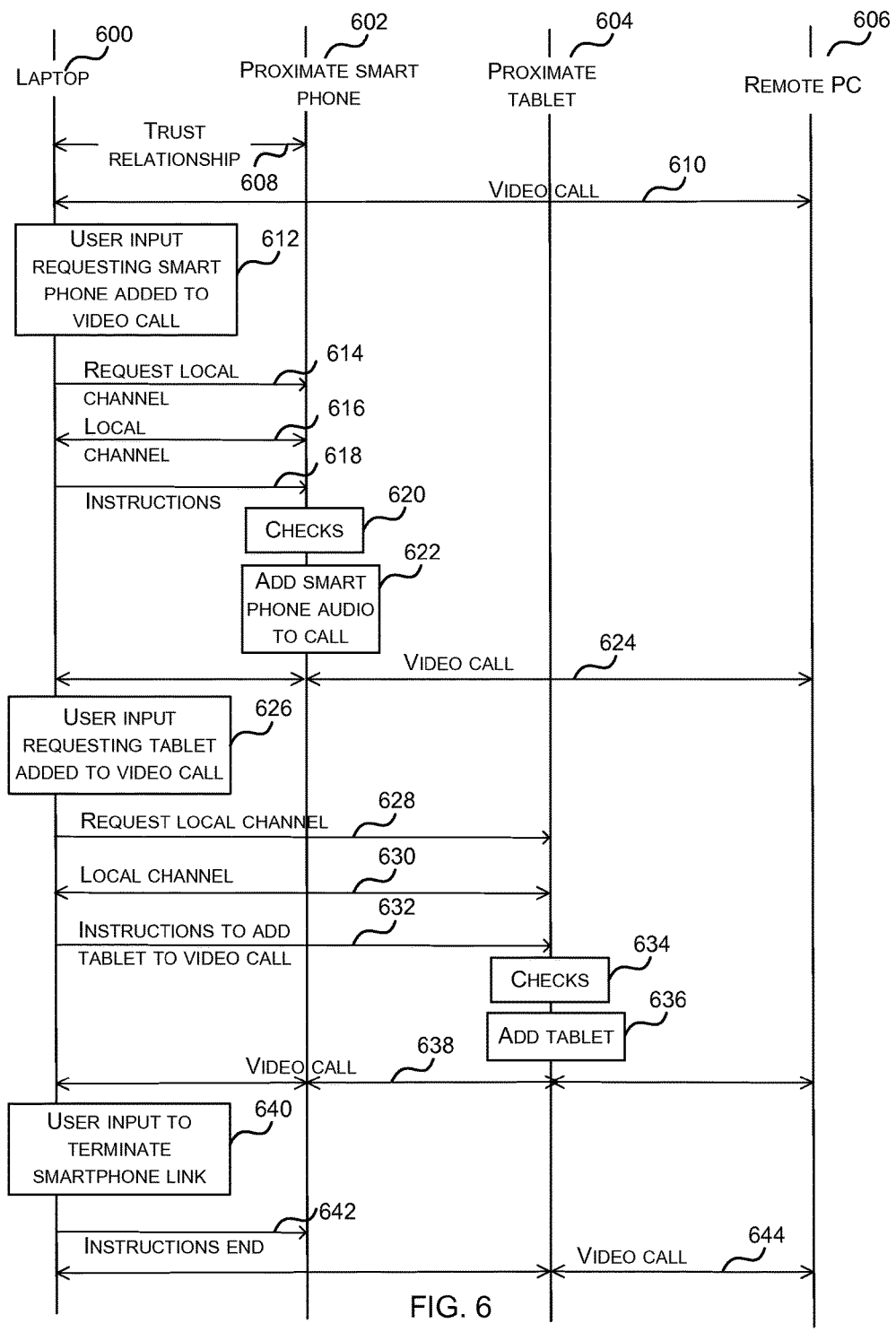
FIG. 6 is a message sequence chart of an example in which a smartphone and a table computer both of which are proximate to a laptop computer, join a video call which is ongoing at the laptop computer.

The example of FIG. 6 has a laptop computer 600, a smartphone 602 proximate to the laptop computer 600, a tablet computer 604 proximate to the smartphone 602 and the laptop 600, and a remote personal computer 606. A trust relationship exists between the laptop 600 and the smartphone 602. A video call 610 is ongoing between the laptop and the remote PC 606.

The laptop 600, smart phone 602 and tablet 604 discover one another as proximate devices using any of the methods described above.

The laptop 600, smartphone 602 and tablet 604 each send and receive proximate resource pool data as explained above with reference to FIGS. 2 and 3. This is not shown in FIG. 6 to save space. An online service may be used for the discovery and/or for sending and receiving the proximate resource pool data even though no online service is shown in FIG. 6.

The laptop computer receives user input 612 requesting the smartphone be added to the video call. For example, this is received as a result of a suggestion computed by the laptop being accepted by a user. In another example, the user input is received without a suggestion having been made.

Unless one already exists, the laptop requests 614 a persistent communications channel by sending a message to the smartphone 602. A persistent communications channel 616 is established between the laptop 600 and the smartphone 602. The laptop sends instructions 618 to the smartphone 602 over the persistent communications channel 616. The smartphone carries out checks 620 as described above with reference to FIG. 2. If the checks are passed, the smartphone is added to the video call 622 as illustrated by arrows 624. This is achieved by operations at the smartphone which enable the smartphone to join the video call.

The laptop computer 600 receives 626 user input requesting the tablet 604 be added to the video call. Unless one already exists, the laptop sends a message 628 to the tablet to request a persistent communications channel. A persistent communications channel 630 is set up between the laptop and the tablet. Instructions are sent 632 from the laptop 600 to the tablet 604 over the persistent communications channel to add the tablet to the video call. The tablet computer checks 634 that the instructions are from a trusted device or have been accepted by a user. The tablet computer may check if the instructions conflict with the proximate resource pool data of the tablet. If the checks are passed the tablet adds itself 636 to the video call. This is indicated by line 638 of FIG. 6 which shows the video call as three calls joined together.

User input is received 640 at the laptop 600 to terminate the smartphone link. As a result, instructions are sent 642 to the smartphone over the persistent communications channel 616 already set up between the laptop and smartphone 602. The smartphone carries out checks as described above (not shown in FIG. 6 due to lack of space). The smartphone takes itself out of the video call. This results in the video call represented by line 644 having three parties, the laptop 600, the tablet 604 and the remote PC 606.

The example of FIG. 6 may give rise to the following scenario which illustrates the utility and ease of use of the technology.

Ben and Ann are the parents of Cate and Dan. They regularly video call with Ben's parents Ed and Fran, who live in another country. On Christmas day Ed and Fran want to see their grandchildren open the presents that Ed and Fran have sent.

Ed and Fran video-call from their desktop 606. Ben answers the video-call on his laptop 600.

Ben sets the laptop 600 up on the living room coffee table facing the couch, and initially all four of Ben, Ann, Cate, and Dan are on the couch facing the laptop, so all can be seen and heard on one device.

When it is time to open the presents, Ann picks up her smartphone 602. Since Ann and Ben are tagged as spouses on one another's contact lists, all of their devices trust one another. Ann's smartphone's interface notifies her that a call is in progress. This could be an interface on the lock screen, or, if the phone is unlocked, through a notification interface, or through Ann bringing up a specialized resource pool interface. The interface offers Ann her choice of cameras and audio to use in the call Ann taps on an icon to indicate smartphone rear camera and all audio (microphone and speakers). Alternatively, if Ann opens the same video calling application as on the laptop, she is notified that a call is in progress on the tablet and taps on the camera icon on the smartphone. Regardless of the method by which the smartphone's camera is activated, since Ann and Ben's devices trust one another, Ann's smartphone rear camera stream video now appears in an additional window on both Ben's local laptop and Ed and Fran's remote desktop. Ann gives the smartphone to Dan so that Ed and Fran can now see and hear Dan open his present. Ben picks up his tablet and goes though the same process to add it to the call. Cate takes the tablet over to her present and also chats to her grandparents.

When the kids drift away from chatting to their grandparents but are still playing in front of the smartphones cameras, Ben notices that there is some feedback from the two new microphones added to the call, so he opens an interface on his laptop and mutes the two smartphone microphones. The grandparents can thus still see Cate and Dan playing with their respective presents, but Ann and Ben can talk to Ed and Fran without feedback or distraction.

When the kids move even further away, Ben terminates the smartphone link to the video call entirely but keeps the tablet's video running and props it up to face the children so that the grandparents can continue to watch the children play while also talking to Ann and Ben.

Figure 7:
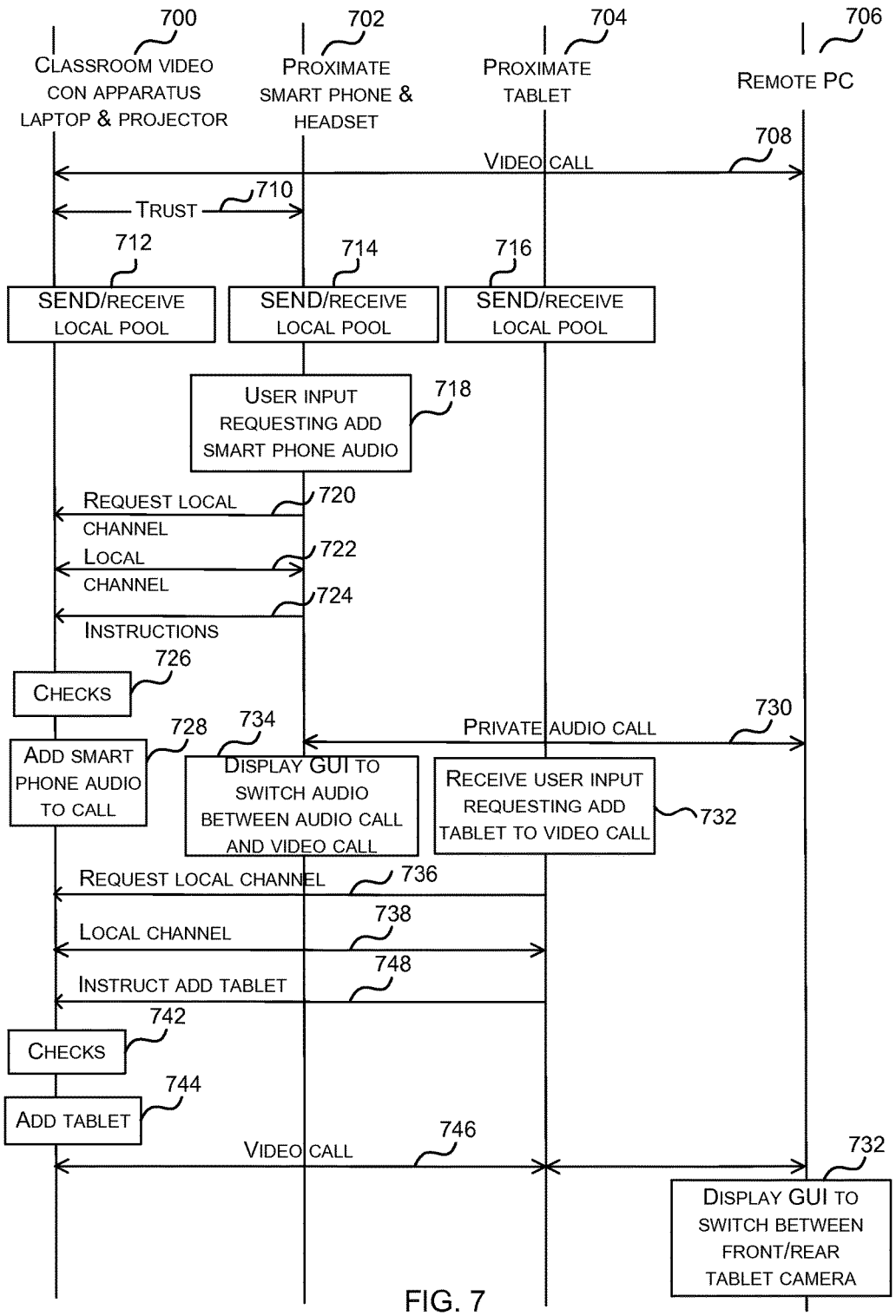
FIG. 7 is a message sequence chart of an example in which a smartphone and a table computer both of which are proximate to a video conference apparatus, join an ongoing video call at the video conferencing apparatus, and in which a private audio call is established.

The example of FIG. 7 involves a classroom video conferencing apparatus 700 comprising a laptop and a projector, a smartphone and headset 702, a tablet computer 704 and a remote personal computer 706. The laptop, smartphone and tablet are all physically proximate to one another whilst the PC is in a remote location. A video call 708 is ongoing between the laptop 700 and the remote PC 706. A trust relationship exists between the smartphone 702 and the laptop 700, for example, because these devices are owned by the same person and each device knows the identity of the other device. Each of the laptop 700, smartphone 702 and tablet 704 discover one another as proximate devices using any of the methods described above. Each of the laptop 700, smartphone 702 and tablet 704 send and receive local pool data 712, 714, 716 as described above with reference to FIGS. 2 and 3. An online service may be used for the discovery and/or for sending and receiving the proximate resource pool data even though no online service is shown in FIG. 7.

User input 718 is received at the smartphone 702 requesting the smartphone audio input and output be added to the video call 708 in a private manner, so that the audio between the smartphone and the remote PC is not disclosed to the laptop. Unless one already exists, the smartphone 702 requests a persistent communications channel by sending message 720 to the laptop. A persistent communications channel 722 is established between the laptop 700 and the smartphone 702 such as a Wi-Fi (trade mark) channel. Instructions are sent 724 over the persistent communications channel to the laptop. The laptop carries out checks 726 as described above with reference to FIG. 3. If the checks are successfully passed the laptop adds 728 the smartphone audio to the call with privacy. For example, a separate private audio call 730 is set up between the smartphone and the remote PCC 706 and this private audio call 730 is then joined with the video call 708. In another example, the smartphone is added as a device to the ongoing video call 708 and then the audio component of the video call is transferred so that it is only present between the smartphone and the remote PC.

In some examples, a graphical user interface (GUI) may be displayed 734 at the smartphone 702 to enable the smartphone user to switch the audio between the private audio call 730 and the video call 708.

User input is received 732 at the tablet 704 requesting addition of the tablet to the video call. A persistent communications channel is requested by sending message 736 from the tablet 704 to the laptop 700. Unless one already exists, a persistent communications channel is set up as a result 738 and instructions are sent 740 on the persistent communications channel to add the tablet. The laptop receives the instructions and checks 742 using the checks described above with reference to FIG. 3. If the checks are passed successfully the laptop adds 744 the tablet to the video call 746. The remote PC displays a graphical user interface 748 to enable the user of the remote PC to switch between front and rear cameras of that device.

The example of FIG. 7 may give rise to the following scenario which illustrates the utility and ease of use of the technology.

Jane is the instructor in a classroom with students sitting in groups at three tables. A video call to remote guest Ken with PC 706 is showing on a projected screen at the front of the classroom. Ken initially sees a wide view of the entire classroom from Jane's laptop 700 camera and hears audio from the laptop microphone. Ken first talks to the class and then wants to set each group a task and see the results. He also wants to be able to speak to Jane privately to help her manage the students locally.

Jane takes out her smartphone 702, unlocks it, and also puts on a Bluetooth hands-free single-ear headset. Jane's headset pairs with her smartphone. Jane brings up the resource pool interface on her smartphone. Since Jane's laptop and smartphone know that they are owned by Jane, in close proximity, and that a video call is in progress on Jane's laptop, the smartphone interface offers Jane her choice of cameras and audio for the call. Ann taps on Add Smartphone Audio and then on an icon for Ken. Jane's smartphone audio is added to the video call audio playing at Ken's end of the call but not to the public audio in the classroom. Jane hears Ken's audio playing in her ear.

Ken sees an interface element that allows him to switch his audio from the public call to Jane privately or both. Jane and Ken are now set up to interact privately in order to manage the classroom while Ken is still able to see the wide view of the classroom and hear the whole classroom.

Each student group props a tablet up on the table and turns it on. Each tablet brings up the resource pool interface. The interface tells each tablet that a video call is in progress in a machine in the room and offers to request access to allow adding a choice of his cameras and audio to the call. One student in each group taps Add All. Jane's smartphone and laptop both notify her that joining requests have been made. As she is on the other side of the classroom, but her laptop and smartphone know that she owns both, Jane is able to unlock her smartphone and tap Accept All. All three tablets join the call.

Ken's video appears on the display of each tablet, and his audio plays from the tablet speaker. On Ken's laptop, interface elements appear to show the video of each Ken's front and rear camera—Ken can switch from front to rear camera or see both at the same time for each tablet. Ken can also hear the audio from each tablet microphone if he wishes—and he can mute any one or more tablet's audio on his laptop. He can also mute his own audio to any tablet and/or the room as a whole.

Ken gives instructions group by group. In each case he selects the front camera of each tablet so that he can see the students and turns on the tablet microphone so that he can hear the students. Once he is finished giving instructions, the student groups go to work.

During the task work time, Ken periodically checks in with Jane with private audio to assist her physically helping each student group. He also periodically checks in with each student group, muting his audio to the other groups so that they are not distracted and also muting the audio from the groups that he is not currently interacting with.

At the end of the task work time Ken asks each group to present their results to him and the class. Jane turns off her Bluetooth headset and her private audio connection to Ken is ended. In turn, each group holds up completed work to the camera or moves the camera around completed work and to each speaking student. The video from each tablet's front or rear camera (as appropriate) is displayed on the projected screen at the front of the classroom while the tablet microphone captures the audio of speaking students in the group.

When the presentations are complete Jane unlocks her smartphone and ends the connection to all tablets. Jane and the students thank Ken via the room laptop's microphone and then Jane ends the video call.

Figure 8:
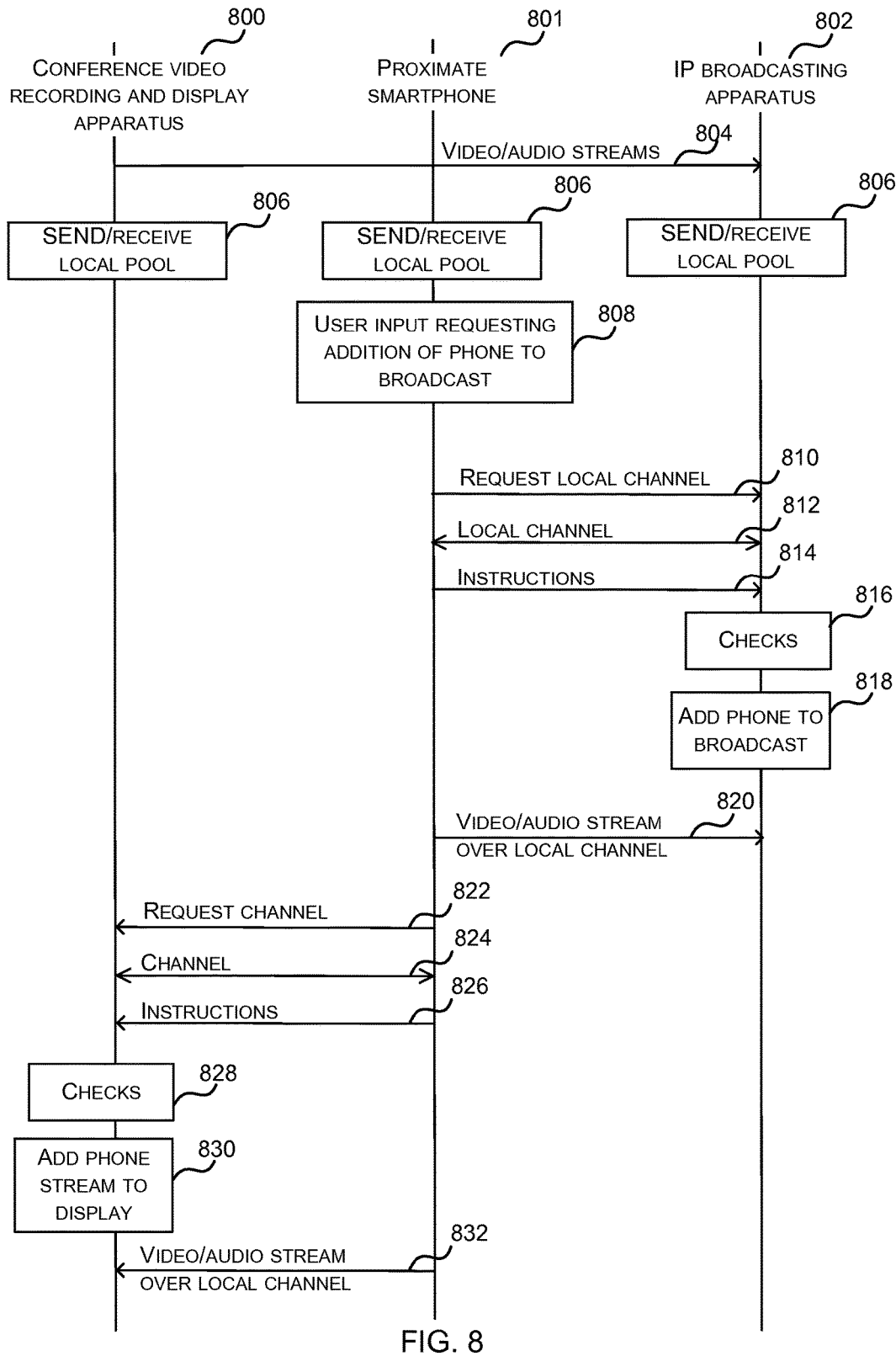
FIG. 8 is a message sequence chart of an example in which a video recording and display apparatus sends a video and audio stream to a proximate internet protocol broadcasting apparatus.

FIG. 8 is an example where the telecommunications activity is a video and audio stream for internet protocol broadcasting. A video recording and display apparatus 800, smartphone 801 and internet protocol broadcasting apparatus 802 are located in the same room and discover one another as proximate devices using any of the methods described above. A video and audio stream is being captured at apparatus 800 and sent to the broadcasting apparatus 802 over an established channel 804 such as a TCP channel. The video recording and display apparatus 800, smartphone 801 and broadcasting apparatus 802 each send and receive proximate resource pool data 806 as described above with reference to FIGS. 2 and 3. An online service may be used for the discovery and/or for sending and receiving the proximate resource pool data even though no online service is shown in FIG. 8.

User input is received 808 at the smartphone 801 requesting addition of the smartphone 801 to the broadcast at the display apparatus 800 and as part of a broadcast (such as over the internet) made by apparatus 802. Unless one already exists, a persistent communications channel is requested by sending a message 810 from the smartphone 801 to the broadcasting apparatus 802. This results in persistent communications channel 812 being established between the smartphone 801 and the broadcasting apparatus 802. Instructions are sent 814 over the established channel to the broadcasting apparatus which carries out checks 816 as described with reference to FIG. 3. If the checks are passed successfully the broadcasting apparatus 802 adds 818 the smartphone 801 to the broadcast.

As a result a video and audio stream is captured at the smartphone 801 and sent to the broadcasting apparatus 802 for addition to the video and audio stream 804 being broadcast (for example over the internet).

In the meantime, a request 822 is sent from smartphone 801 to video recording and display apparatus 800 for a persistent communications channel (unless one already exists between these two entities). A persistent communications channel 824 is set up between these two entities and instructions 826 are sent from the smartphone 801 to the video recording and display apparatus 800. The instructions are to add the smartphone captured audio and video to the display. The video recording and display apparatus 800 makes checks 828 as described above with reference to FIG. 3 and if the checks are passed, it adds the phone audio and video stream to the display 830. The phone video and audio streams are thus sent 832 to the video recording and display apparatus 800 over channel 824.

The example of FIG. 8 may give rise to the following scenario which illustrates the utility and ease of use of the technology.

Ann is the keynote speaker at a conference. Her presentation is finished and now she wants to take questions. The conference room wide view, a close view of Ann, and Ann's audio are being captured by video recording and display apparatus 800, live-streamed onto an Internet broadcast site and also displayed on a large screen at the front of the room. The conference organizers want to also show video and audio of individual questioners.

Ben is running a multimedia broadcast application, at apparatus 802, which allows him to pick and choose audio and video feeds to broadcast.

When Ann indicates that she will answer the question of a particular attendee. A volunteer walks over and stands near the front of the attendee and brings up the resource pool interface on a smartphone 801. The interface tells the volunteer that a video broadcast is in progress from a machine in the room and offers to request access to allow the volunteer to add a choice of cameras and audio to the call. The volunteer taps Add All.

Ben sees a request from a volunteer's smartphone 801 to join the broadcast. Ben clicks Accept. The attendee is free to address the keynote speaker while the volunteer films the question. The attendee can be seen and heard both on the large screen at the front of the room (so that all other attendees can see and hear it) and it is also fed into the live stream Internet broadcast. This is the end of the five examples.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

Figure 9:
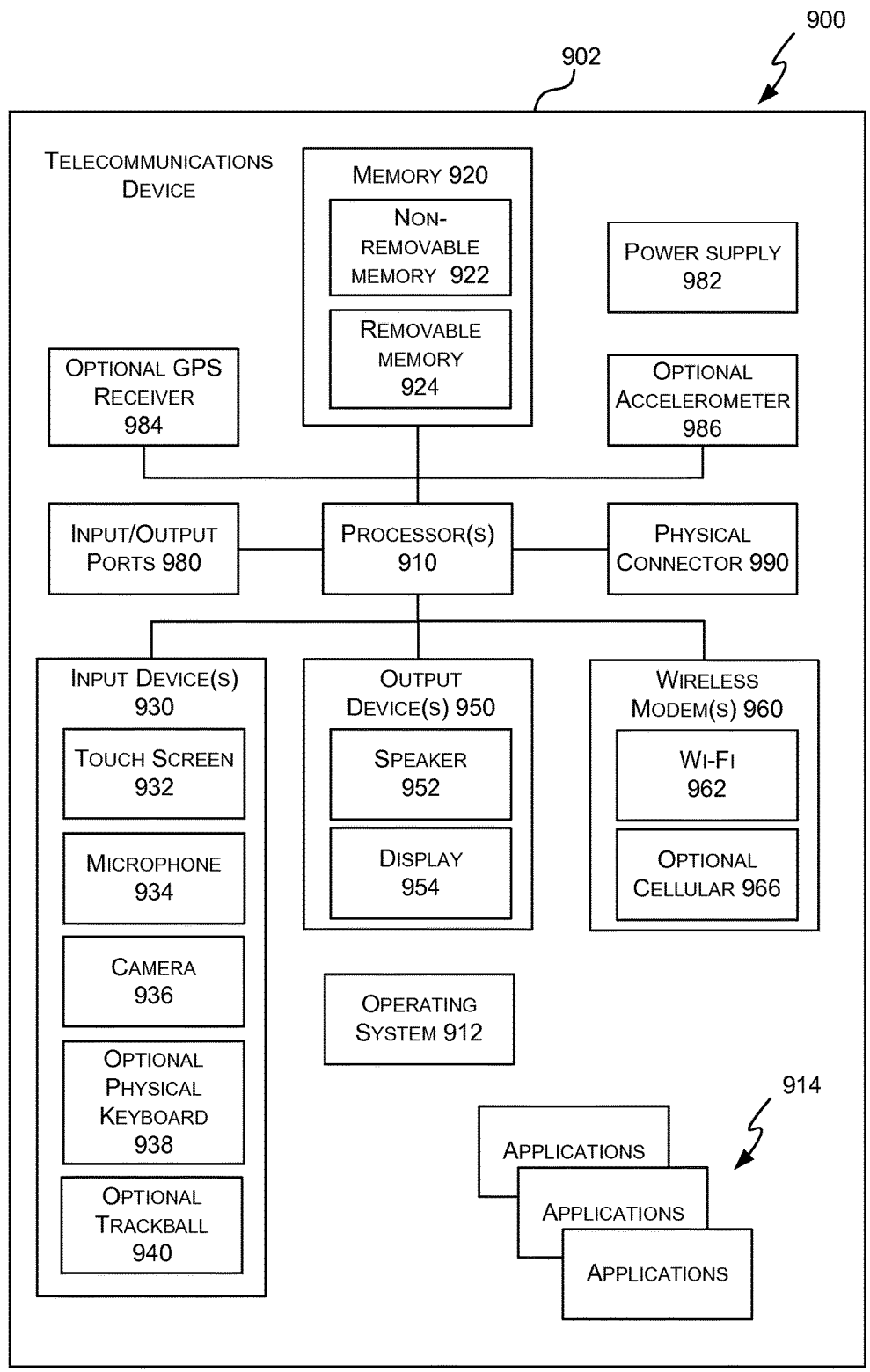
FIG. 9 illustrates an exemplary telecommunications device in which embodiments of proximate resource pooling may be implemented.

FIG. 9 illustrates various components of an exemplary telecommunications device 900 which may be implemented as any form of a computing and/or electronic device, and in which embodiments of any of the methods of FIGS. 2 to 8 may be implemented.

Telecommunications device 900 comprises one or more processors 910 which may be microprocessors, controllers or any other suitable type of processors for processing computer executable instructions to control the operation of the device in order to carry out any of the methods of FIGS. 2 to 8. In some examples, for example where a system on a chip architecture is used, the processors 910 may include one or more fixed function blocks (also referred to as accelerators) which implement a part of the method of any of FIGS. 2 to 8 in hardware (rather than software or firmware). Platform software comprising an operating system 912 or any other suitable platform software may be provided at the telecommunications device to enable application software 914 to be executed on the device.

The computer executable instructions may be provided using any computer-readable media that is accessible by telecommunications device 900. Computer-readable media may include, for example, computer storage media such as memory 920 and communications media. Computer storage media, such as memory 920, includes volatile and non-volatile, removable 924 and non-removable 922 memory implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Propagated signals may be present in a computer storage media, but propagated signals per se are not examples of computer storage media. Although the computer storage media (memory 920) is shown within the telecommunications device 900 it will be appreciated that the storage may be distributed or located remotely and accessed via a network or other communication link (e.g. using input ports 980 and/or modems 960).

The telecommunications device 900 also output devices 950 comprising a speaker 952, and a display 954. Display 954 may be separate from or integral to the telecommunications device 900. The display may provide a graphical user interface.

Input devices 930 are arranged to receive and process input from one or more devices, such as a touch screen 932 optionally with finger hover detection, a microphone 934, a camera 936, an optional physical keyboard 938, an optional trackball 940 or other sensors. In some examples the input devices 930 may detect voice input, user gestures or other user actions and may provide a natural user interface (NUI). This user input may be used to add, edit or delete activities, accept or reject suggestions, and for other purposes. In an embodiment the display device 954 may also act as a user input device 930 if it is a touch sensitive display device.

Wireless modems 960 support two-way communications between the processors 910 and external devices. The modems 960 may comprise radio-based modems such as Wi-Fi modem 962 and may also comprise cellular modem 966 configured to enable phone calls and optionally transmit data, according to any suitable communication standard or technology such as GSM (trade mark), 3G, 4G, 5G and others. At least one of the wireless modems 960 is typically configured for communication with one or more cellular networks, such as GSM (trade mark) network for data and voice communications using cellular networks and/or a public switched telephone network.

The telecommunications device 902 may also comprise an input/output port 980, an optional global positioning system (GPS) receiver 984, a power supply 982, an accelerometer 986, and a physical connector 990 such as a USB port or other type of port.

Any of the input devices 930 and output devices 950 may comprise NUI technology which enables a user to interact with the telecommunications device in a natural manner, free from artificial constraints imposed by input devices such as mice, keyboards, remote controls and the like. Examples of NUI technology that may be provided include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that may be used include intention and goal understanding systems, motion gesture detection systems using depth cameras (such as stereoscopic camera systems, infrared camera systems, rgb camera systems and combinations of these), motion gesture detection using accelerometers/gyroscopes, facial recognition, 3D displays, head, eye and gaze tracking, immersive augmented reality and virtual reality systems and technologies for sensing brain activity using electric field sensing electrodes (EEG and related methods).

An example provides a telecommunications device comprising an output configured to send messages comprising data about telecommunications resources of the device and current state of the telecommunications resources of the device;

an input configured to receive messages which are known to be from one or more other telecommunications devices physically proximate to the telecommunications device, about telecommunications resources and current state of telecommunications resources of the physically proximate telecommunications devices;

a processor configured to determine a proximate resource pool using at least the telecommunication resources of the other devices and the state of the telecommunication resources of the other devices, the proximate resource pool comprising a list of content streams being generated by, or potentially being generated by, specified ones of the other devices;

the processor configured to send to a display, data about the proximate resource pool;

the processor configured to receive user input selecting at least one of the content streams and at least one of the other devices; and the processor configured, in response to the received user input, to send instructions to the selected one of the other devices, the instructions being to add, divert or stop the selected content stream within a telecommunications activity ongoing at the selected one of the other devices.

For example the processor is configured to establish communications channels with the physically proximate telecommunications devices via an online service and/or using local wireless communications.

For example the processor is configured to discover one or more of the physically proximate telecommunications devices as a result of any one or more of: user input, local range sensing, calendar appointment data, user context data.

For example the processor is configured to establish communications channels with the physically proximate telecommunications devices via an online service and wherein the input is configured to receive the proximate resource pool from the online service.

For example, the current state of a telecommunications device resource comprises data indicating whether the resource is currently active, currently inactive or in a background state.

For example the processor is configured to compute, using the proximate resource pool, one or more suggestions of adding, diverting or stopping individual ones of the content streams.

For example the processor is configured to request and receive user input selecting at least one of the suggestions.

For example the processor is configured to determine the proximate resource pool by omitting data marked as private.

For example the output configured to send the messages by broadcasting the messages using wireless local area communications.

Another example provides a telecommunications device comprising an output configured to send messages comprising data about telecommunications resources of the device and current state of the resources;

an input configured to receive messages about telecommunications resources and current state of telecommunications resources only of physically proximate telecommunications devices;

a processor configured to determine a proximate resource pool using at least the telecommunication resources of the other devices, and the state of the telecommunications resources of the other devices, the proximate resource pool comprising a list of content streams being generated by, or potentially being generated by, specified ones of the other devices;

the processor configured to receive instructions from one of the other devices, the instructions being to add, divert or stop a specified content stream of the proximate resource pool within a telecommunications activity ongoing at the device; and the processor configure to execute the instructions responsive to the instructions being from a trusted device, or responsive to user authorization.

For example the processor is configured to compute whether any conflict exists between the received instructions and the determined proximate resource pool.

For example the processor is configured to execute the instructions only if no conflict is computed.

For example the processor is configured to receive the instructions over any one or more of: a wireless local area communications channel established between the telecommunications device and the one of the other devices, a communications channel established between the telecommunications device and the one of the other devices via an online service.

For example the telecommunications call is a video call and wherein the processor is configured to execute the instructions in order to implement any of: transferring audio of a video call ongoing at the telecommunications device to the device from which the instructions were received, adding the device from which the instructions were received to a video or audio call ongoing at the telecommunications device, adding the device to a video call which is ongoing at other telecommunications devices, establishing a new call.

For example the processor is configured to execute the instructions in order to send a video and/or audio stream to an internet protocol broadcasting apparatus.

An example provides a computer-implemented method at a telecommunications device comprising sending messages to physically proximate telecommunications devices, the messages comprising data about telecommunications resources of the device and current state of the telecommunications resources of the device;

receiving messages which are known to be from one or more other telecommunications devices physically proximate to the telecommunications device, about telecommunications resources and current state of telecommunications resources of the physically proximate telecommunications devices;

determining a proximate resource pool using at least the telecommunication resources of the other devices and the state of the telecommunications resources of the other devices, the proximate resource pool comprising a list of content streams being generated by, or potentially being generated by, specified ones of the other devices;

receiving instructions from one of the other devices, the instructions being to add, divert or stop one of the content streams within a telecommunications activity ongoing at the device; and executing the instructions responsive to the instructions being from a trusted device, or responsive to user authorization.

The method may comprise computing whether any conflict exists between the received instructions and the proximate resource pool.

The method may comprise executing the instructions only if no conflict is computed.

The method may be where the specified activity is a video call and wherein executing the instructions comprises any of: transferring audio of a video call ongoing at the telecommunications device to the device from which the instructions were received, adding the device from which the instructions were received to a video or audio call ongoing at the telecommunications device, adding the device to a video call which is ongoing at other telecommunications devices, establishing a new call.

The method may be at least partially carried out using hardware logic.

The term 'computer' or 'telecommunications device' is used herein to refer to any device with processing resource such that it can execute instructions. Those skilled in the art will realize that such processing resources are incorporated into many different devices and therefore the terms 'computer' and 'telecommunications device' each include PCs, servers, mobile telephones (including smartphones), tablet computers, set-top boxes, media players, games consoles, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible storage media include computer storage devices comprising computer-readable media such as disks, thumb drives, memory etc and do not include propagated signals. Propagated signals may be present in a tangible storage media, but propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A telecommunications device comprising:
a user interface;
an output configured to send messages comprising data about telecommunication resources of the telecommunications device and current state of the telecommunication resources of the telecommunications device;
an input configured to receive messages which are known to be from one or more other telecommunications devices physically proximate to the telecommunications device, the messages about telecommunication resources and current state of the telecommunication resources of the other telecommunications devices;
a processor configured to:
determine a proximate resource pool using at least the telecommunication resources of the other telecommunications devices and the current state of the telecommunication resources of the other telecommunications devices, the proximate resource pool comprising a list of content streams being generated by, or potentially being generated by, at least one of the telecommunications device or specified ones of the other telecommunications devices;
receive instructions from a particular telecommunications device of the one or more other telecommunications devices, the instructions designating a selected content stream of the list of content streams and comprising instructions to add, divert or stop the selected content stream within a telecommunications activity ongoing at the telecommunications device;
determine an indication of whether any conflict exists between the received instructions and the proximate resource pool at least in part by determining whether a resource of the telecommunications device needed by the instructions is indicated in the proximate resource pool as being fully utilized;
present, via the user interface, a notification of the instructions;
receive, via the user interface, user permission to proceed with the instructions; and
execute the instructions with respect to the selected content stream in response to:
the user permission; and
the indication that no conflict exists between the received instructions and the proximate resource pool.

2. The telecommunications device of claim 1, the processor configured to establish communications channels to exchange content streams associated with an individual video call with the other telecommunications devices via an online service and/or using local wireless communications.

3. The telecommunications device of claim 2, the processor configured to discover the content streams from the other telecommunications devices as a result of at least one of: user input, local range sensing, calendar appointment data, or user context data.

4. The telecommunications device of claim 1, wherein the processor is configured to establish communications channels with the other telecommunications devices via an online service and wherein the input is configured to receive the proximate resource pool from the online service.

5. The telecommunications device of claim 1, wherein a state of a telecommunication resource comprises data indicating whether the telecommunication resource is currently active, currently inactive or in a background state.

6. The telecommunications device of claim 1, wherein the processor is configured to compute, using the proximate resource pool, one or more suggestions of adding, diverting or stopping individual ones of the content streams.

7. The telecommunications device of claim 6, wherein the processor is configured to request and receive user input selecting at least one suggestion.

8. The telecommunications device of claim 1, wherein the processor is configured to determine the proximate resource pool by omitting data marked as private.

9. The telecommunications device of claim 1, the output configured to send the messages by broadcasting the messages comprising the data about the telecommunication resources of the telecommunications device and the current state of the telecommunication resources using wireless local area communications.

10. The telecommunications device of claim 1, the processor configured to determine the proximate resource pool comprising the list of content streams being generated, or potentially being generated, concurrently with the determination of the proximate resource pool.

11. A device comprising:
a processor; and
memory storing first instructions that, when executed by the processor, cause the device to:
send, to another device, first data associated with telecommunication resources of the device and a current state of the telecommunication resources of the device;
receive, from the other device, second data associated with telecommunication resources of the other device and a current state of the telecommunication resources of the other device;
determine a proximate resource pool based at least in part on at least: the telecommunication resources of the device, the telecommunication resources of the other device, the current state of the telecommunication resources of the device, and the current state of the telecommunication resources of the other device, the proximate resource pool comprising a shared list of content streams being generated by, or potentially being generated by, the device and the other device;
receive second instructions from the other device, the second instructions to perform at least one of the following:
adding a specified content stream in the shared list of content streams to a telecommunications activity ongoing at the device;
diverting a specified content stream in the shared list of content streams from a telecommunications activity ongoing at the device; or
stopping a specified content stream in the shared list of content streams within a telecommunications activity ongoing at the device;
determine whether any conflict exists between the second instructions and the proximate resource pool at least in part by determining whether a resource of the device needed by the second instructions is indicated in the proximate resource pool as being fully utilized; and
if no conflict exists, execute the second instructions.

12. The device of claim 11, wherein the first instructions further cause the device to receive the instructions over any one or more of: a wireless local area communications channel established between the device and the other device, a communications channel established between the device and the other device via an online service.

13. The device of claim 11, wherein the telecommunication resources are comprised of a video call and the first instructions further cause the device to execute the second instructions in order to implement any of:
diverting audio of the video call ongoing at the device to the other device from which the second instructions were received;
adding audio to the video call ongoing at the device; or
adding video to the video call ongoing at the device.

14. The device of claim 11, wherein the first instructions further cause the device to execute the second instructions in order to send a video and/or audio stream to an internet protocol broadcasting apparatus.

15. The device of claim 11, further comprising a user interface, wherein the instructions further cause the device to:
present, via the user interface, a notification of the instructions;
receive, via the user interface, user permission to proceed with the instructions; and
execute the instructions in response to the user permission.

16. A computer-implemented method comprising:
determining, by a first device, that a second device is proximate to the first device;
sending, from the first device to the second device, first data associated with telecommunication resources of the first device and a current state of the telecommunication resources of the first device;
receiving, at the first device and from the second device, second data associated with telecommunication resources of the second device and a current state of the telecommunication resources of the second device;
determining a proximate resource pool using at least: the telecommunication resources of the first device, the telecommunication resources of the second device, the current state of the telecommunication resources of the first device, and the current state of the telecommunication resources of the second device, the proximate resource pool comprising a shared list of content streams being generated by, or potentially being generated by, the first device and the second device;
receiving instructions from the second device, the instructions being to add one of the content streams to, divert one of the content streams from, or stop one of the content streams within, a telecommunications activity ongoing at the first device;
determining whether any conflict exists between the received instructions and the proximate resource pool at least in part by determining whether a resource of the first device needed by the instructions is indicated in the proximate resource pool as being fully utilized; and if no conflict exists, executing the instructions responsive to user authorization.

17. The method of claim 16, wherein the telecommunications activity is a video call and wherein executing the instructions comprises any of: diverting audio of the video call ongoing at the first device to the second device from which the instructions were received or adding audio to the video call ongoing at the first device.

18. The method of claim 16, at least partially carried out using hardware logic.

19. The method of claim 16, further comprising:

presenting, via a user interface of the first device, a notification of the instructions;

receiving, via the user interface, user permission to proceed with the instructions; and executing the instructions in response to the user permission.

* * * * *